(12) United States Patent
Shibata

(10) Patent No.: US 7,957,629 B2
(45) Date of Patent: Jun. 7, 2011

(54) IMAGE RECORDING/REPRODUCING APPARATUS

(75) Inventor: Hiroshi Shibata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 790 days.

(21) Appl. No.: 11/609,764

(22) Filed: Dec. 12, 2006

(65) Prior Publication Data

US 2007/0140665 A1 Jun. 21, 2007

(30) Foreign Application Priority Data

Dec. 16, 2005 (JP) ................................. 2005-363447
Oct. 6, 2006 (JP) ................................. 2006-275043

(51) Int. Cl.
*H04N 5/77* (2006.01)
*H04N 5/775* (2006.01)
(52) U.S. Cl. ....................................... 386/358; 386/230
(58) Field of Classification Search .................... 386/46,
386/107, 117, 118, 124, 210, 224, 227, 230,
386/358, 359, 362
See application file for complete search history.

(56) References Cited

U.S. PATENT DOCUMENTS

| 7,065,208 | B2 | 6/2006 | Tsubai et al. |
| 2004/0004667 | A1 | 1/2004 | Morikawa et al. |
| 2004/0140967 | A1 | 7/2004 | Kojo |
| 2006/0204241 | A1* | 9/2006 | Koide et al. .................. 396/423 |

FOREIGN PATENT DOCUMENTS

| JP | 2003-060949 A | 2/2003 |
| JP | 2006-101053 A | 4/2006 |

* cited by examiner

*Primary Examiner* — Robert Chevalier
(74) *Attorney, Agent, or Firm* — Canon USA, Inc. IP Div

(57) ABSTRACT

A multidirectional operation switch is disposed on the same surface as a display area of an image display unit rotatable about a rotating shaft of a hinge when an image recording/reproducing apparatus is in use, and is positioned near the display area and at the other end of the hinge. A concave portion is provided on a recording/reproducing unit so as to prevent a protruding portion of the multidirectional operation switch from coming into contact with the recording/reproducing unit when the image display unit is housed in the main body of the image recording/reproducing apparatus. Thus, regardless of the state of the image display unit with respect to the main body of the image recording/reproducing apparatus, the multidirectional operation switch is located at a position that allows easy operation thereof. The image recording/reproducing apparatus that is compact, lightweight, thin, and has a good design can thus be provided.

4 Claims, 12 Drawing Sheets

IMAGE RECORDING/REPRODUCING APPARATUS

BACKGROUND OF THE INVENTION

1. Field of the Invention

The present invention relates to an image recording/reproducing apparatus capable of reproducing and displaying, on an image display unit, image information input from an image pickup unit or recorded on a recording medium.

2. Description of the Related Art

In some known image recording/reproducing apparatuses, such as that shown in FIG. 14 and Japanese Patent Laid-Open No. 2003-60949, a multidirectional operation switch is disposed on a main body. In particular, a multidirectional operation switch discussed in Japanese Patent Laid-Open No. 2003-60949 is configured such that, in a display screen of an image display unit, directions assigned to respective four ends of an operation key are changed according to the rotation and its associated directional changes of the image display unit.

However, since, in the known image recording/reproducing apparatuses described above, the multidirectional operation switch is disposed on the main body, a user's hand (e.g., a left hand) not holding the main body has to be moved to operate the multidirectional operation switch during shooting. Moreover, it is possible that an image display area, such as a liquid crystal monitor, is covered with the hand. The multidirectional operation switch may be difficult to operate depending on the open/close state or rotating state of the image display unit.

Moreover, if, for example, the multidirectional operation switch is not disposed on the same surface as an image display surface of the image display unit, the multidirectional operation switch, which protrudes and thus is noticeable, may adversely affect the design features of the image recording/reproducing apparatus. It is also possible that the user operates the multidirectional operation switch in a wrong direction.

On the other hand, if the multidirectional operation switch is disposed on the same surface as the image display surface of the image display unit, and if an input from the multidirectional operation switch is always accepted, opening and closing of the image display unit may cause erroneous operation. However, leaving a large gap between the multidirectional operation switch and the main body of the image recording/reproducing apparatus to prevent such erroneous operation makes it difficult to reduce the size, weight, and thickness of the apparatus.

SUMMARY OF THE INVENTION

The present invention provides an image recording/reproducing apparatus in which a multidirectional operation switch is located at a position that allows easy operation thereof regardless of the state of an image display unit with respect to the main body of the image recording/reproducing apparatus, and achieves an image recording/reproducing apparatus which is compact, lightweight, thin, and has a good design.

According to an aspect of the present invention, an image recording/reproducing apparatus is provided including a recording/reproducing unit configured to record or reproduce an image; a hinge attached to a body side of the recording/reproducing unit; an image display unit attached to the hinge, wherein the image display unit is configured to open and close with respect to the recording/reproducing unit and display the image via an image display surface; and a multidirectional operation switch disposed on the same surface side as the image display surface of the image display unit and being generally positioned distal the hinge.

According to another aspect of the present invention, the image recording/reproducing apparatus may further include a concave receiving portion disposed in the body side of the recording/reproducing unit configured to receive a protruding portion of the multidirectional operation switch when the image display unit is in a closed state.

According to yet another aspect of the present invention, a surrounding portion of the multidirectional operation switch may protrude from an outer edge of the image display unit and is configured to serve as a finger grip. And also according to another aspect of the present invention, the hinge may be a biaxial hinge configured to rotate about two axes thereby allowing the image display unit to be rotatable.

Additionally, according to yet another aspect of the present invention, the image recording/reproducing apparatus may further include an open/close detection feature configured to detect an open/close state of the image display unit with respect to the recording/reproducing unit; a rotation detection feature configured to detect a rotating state of the image display unit with respect to the recording/reproducing unit; and a controller configured to perform control for enabling or disabling an input from the multidirectional operation switch on the basis of the state detected by the open/close detecting feature or the rotation detecting feature.

Thus, the present invention can provide an image recording/reproducing apparatus in which a multidirectional operation switch is located at a position that allows easy operation thereof regardless of the state of an image display unit with respect to the main body of the image recording/reproducing apparatus, and achieves an image recording/reproducing apparatus which is compact, lightweight, thin, and has a good design.

Further features of the present invention will become apparent from the following description of exemplary embodiments with reference to the attached drawings.

DESCRIPTION OF THE EMBODIMENTS

Exemplary embodiments, various features and aspects for implementing an image recording/reproducing apparatus of the present invention will now be described with reference to the drawings.

Figure 1:
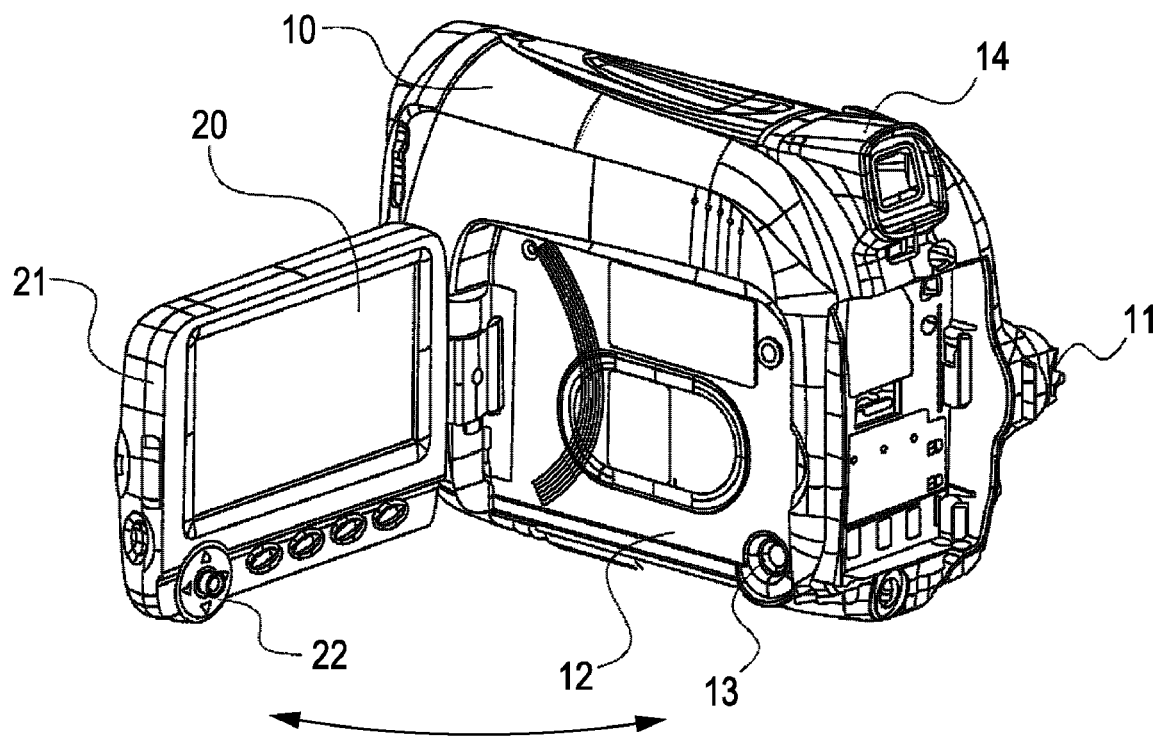
FIG. 1 is a perspective view of an image recording/reproducing apparatus (in normal shooting mode) according to at least one exemplary embodiment of the present invention.

FIG. 1 illustrates an exemplary embodiment of the present invention which is an image recording/reproducing apparatus 10 such as a video camera. A power/mode switch 11 is a switch for turning the power ON and OFF, and for switching between an image pickup mode and a reproduction mode. An image display area 20 is for displaying an image picked up or reproduced by the image recording/reproducing apparatus 10, and is included in an image display unit 21.

A multidirectional operation switch 22 is for controlling various operations of the image recording/reproducing apparatus 10 in multiple directions. For example, depending on the mode of the image recording/reproducing apparatus 10, the multidirectional operation switch 22 enables the user to control the reproduction of an image recorded on a recording medium (not illustrated), or to select and confirm a menu item. In the present exemplary embodiment, the multidirectional operation switch 22 is a tiltable joystick. The movable part of the multidirectional operation switch 22 protrudes in a direction normal to the image display area 20. Instead of being tiltable, the movable part of the multidirectional operation switch 22 may be able to be pressed down in a direction normal to the image display area 20 (i.e., in the axial direction of the movable part). In this case, for example, an item selected from a menu can be confirmed by pressing the movable part of the multidirectional operation switch 22. This eliminates the need for providing different switches for selection and confirmation purposes.

A recessed part 12 is provided for accommodating the image display unit 21. A concave portion 13 is for preventing the protruding portion of the multidirectional operation switch 22 from coming into contact with the image recording/reproducing apparatus 10 when the image display unit 21 is housed in the recessed part 12. There is provided a viewfinder 14 on top of the image recording/reproducing apparatus 10.

Figure 2:
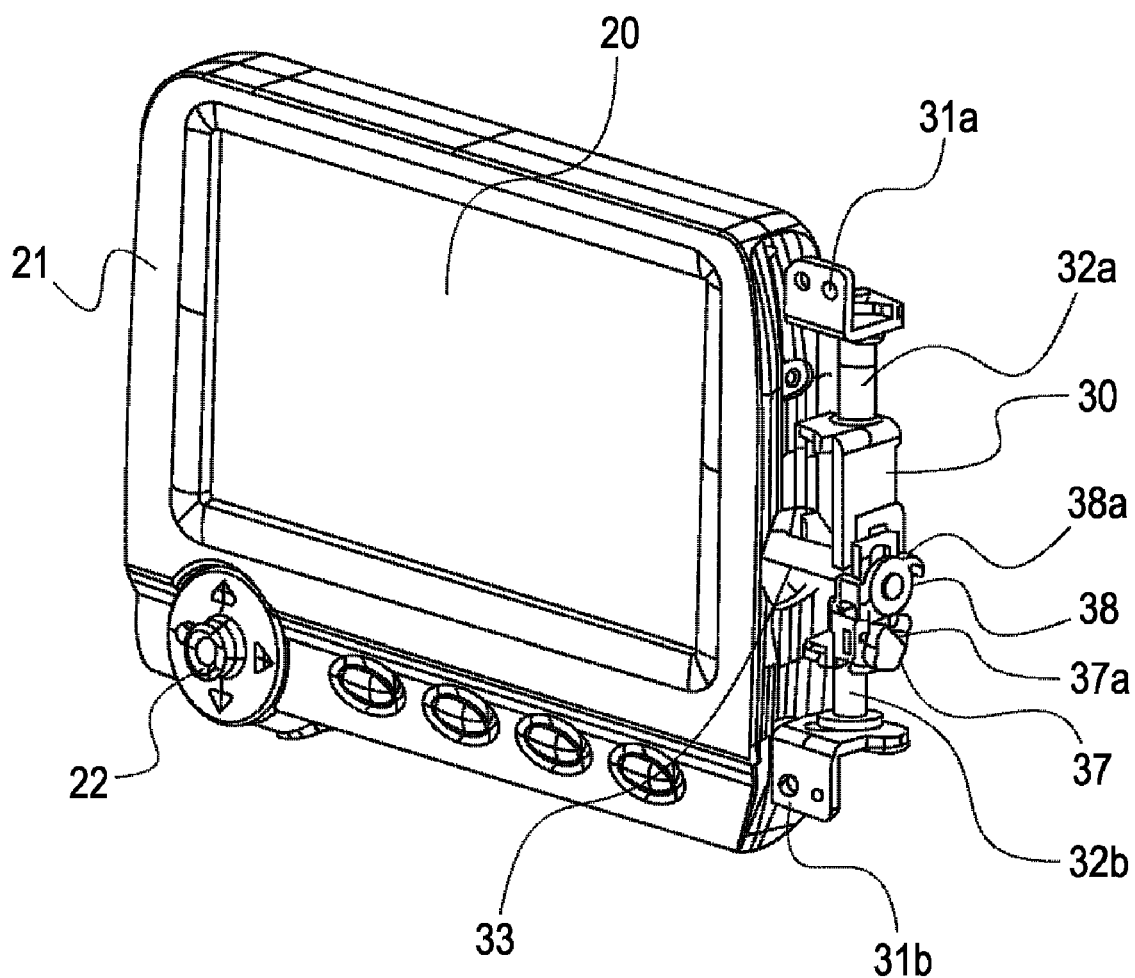
FIG. 2 is an enlarged view of an exemplary image display unit and illustrates a hinge unit and its neighboring parts in detail according to an aspect of the present invention.

FIG. 2 is a detailed illustration of the image display unit 21 of FIG. 1. A hinge unit 30 is for attaching the image display unit 21 to the image recording/reproducing apparatus 10, and allowing the image display unit 21 to open, close, and rotate.

A hinge base 31a and a hinge base 31b enable the hinge unit 30 to be secured to the image recording/reproducing apparatus 10. An opening/closing shaft 32a and an opening/closing shaft 32b are for opening and closing the image display unit 21.

A rotating shaft 33 is for rotating the image display unit 21. A rotation detecting switch 37 detects the rotating state of the image display unit 21. A switch-side lever 37a is part of the rotation detecting switch 37. A switch plate 38 rotates about the rotating shaft 33 of the hinge unit 30 in synchronization with the image display unit 21. A lever 38a is part of the switch plate 38 and is provided for causing the switch-side lever 37a to turn the rotation detecting switch 37 ON and OFF.

The multidirectional operation switch 22 is disposed on the same surface on which the image display area 20 of the image display unit 21 is provided. Specifically, the multidirectional operation switch 22 is disposed near the image display area 20 and at an end opposite the end at which the hinge unit 30 is located. If switches other than the multidirectional operation switch 22 are provided on the same surface, the multidirectional operation switch 22 is better to be more distant from the hinge unit 30 than the other switches are from the hinge unit 30. Generally, the multidirectional operation switch 22 capable of allowing control in multiple directions is used more frequently than the other switches which are only capable of being pressed. Therefore, to prevent a user's hand from coming into contact with the image recording/reproducing apparatus 10 or to keep the user's hand out of the image display area 20, it is better that the multidirectional operation switch 22 be disposed away from the hinge unit 30.

Figure 3:
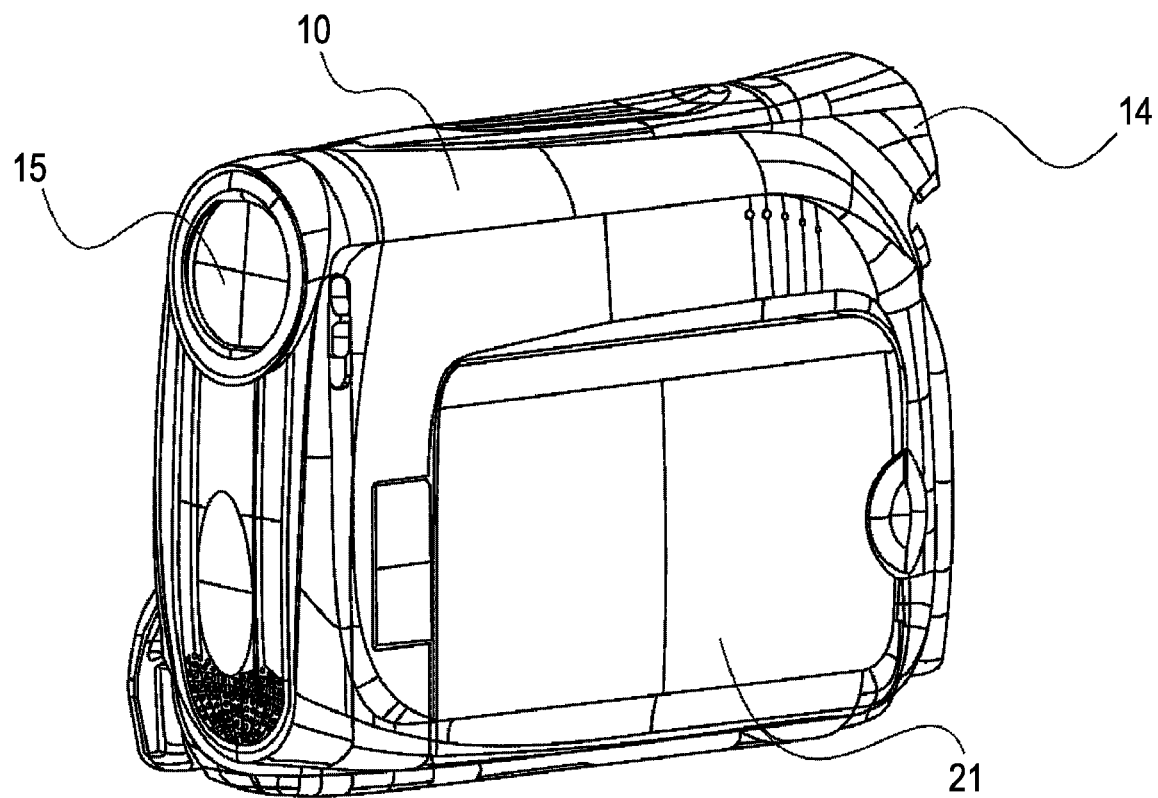
FIG. 3 is a perspective view illustrating an exemplary state in which the image display unit is housed in the image recording/reproducing apparatus according to an aspect of the present invention.

FIG. 3 illustrates a state in which the image display unit 21 is housed in the recessed part 12 of the image recording/reproducing apparatus 10. In this state, the power of the image recording/reproducing apparatus 10 is ON or OFF and the viewfinder 14 is in use. Reference numeral 15 denotes an image pickup lens. The multidirectional operation switch 22 protrudes outward (i.e., downward in the drawing) from an outer edge of the image display unit 21 of FIG. 1 or FIG. 3. Because of its configuration, the multidirectional operation switch 22 is larger in size than the other operation members. Therefore, to achieve compactness of the image display unit 21, the multidirectional operation switch 22 has to protrude from the image display unit 21. When as illustrated in FIG. 3 the image display unit 21 is closed with the image display area 20 inside, the protruding portion of the multidirectional operation switch 22 serves as a finger grip and allows the user to easily open the image display unit 21.

Now referring back to FIG. 1, it is noted that FIG. 1 illustrates a state in which the image display unit 21 pivots about the opening/closing shafts 32a and 32b approximately 90 degrees from one side of the main body in the opening direction. In other words, FIG. 1 illustrates a normal shooting mode of the image recording/reproducing apparatus 10.

Figure 4:
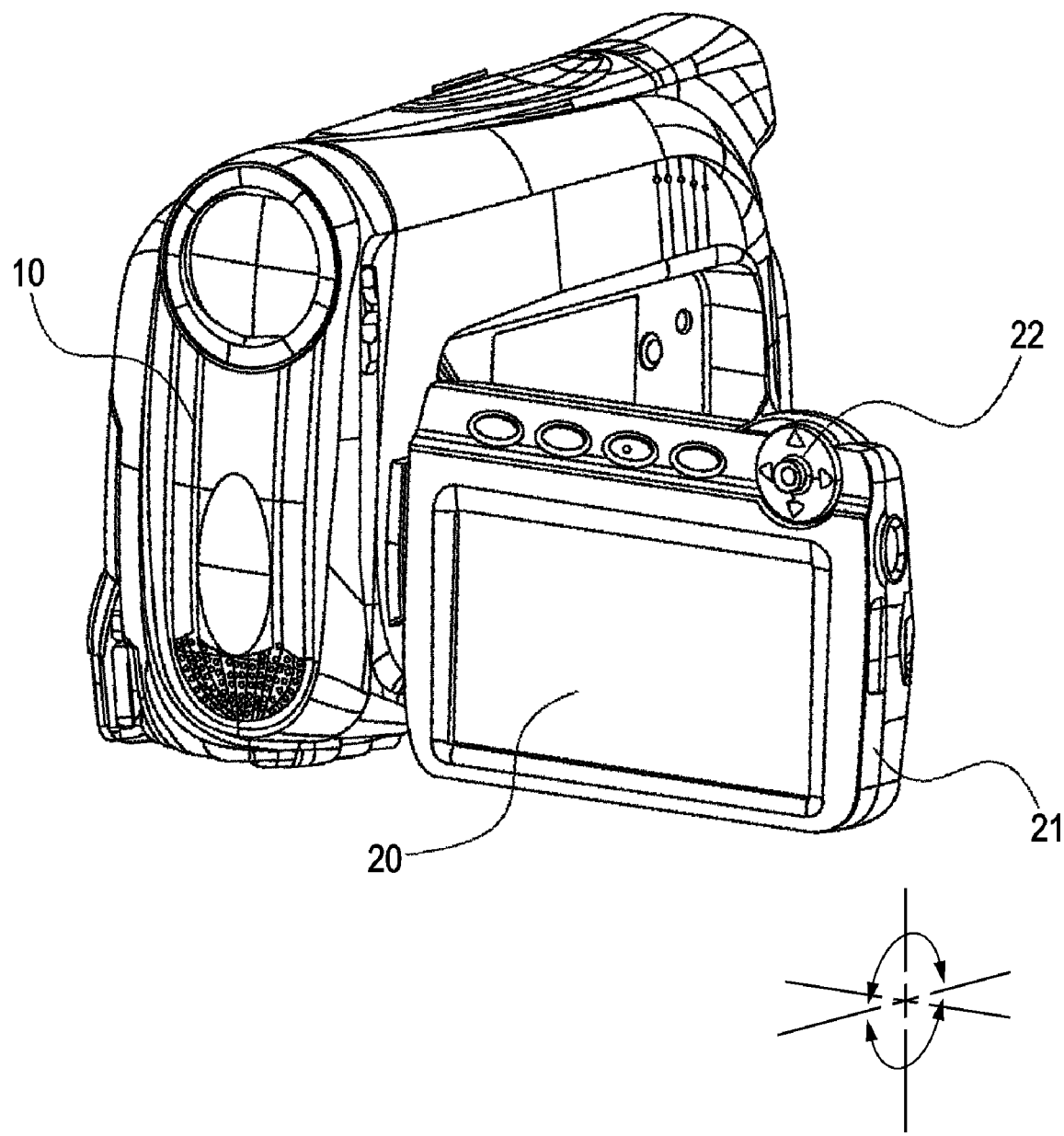
FIG. 4 is a perspective view illustrating an exemplary state (face-to-face shooting mode) in which the image display unit of FIG. 1 is turned upside down according to an aspect of the present invention.

FIG. 4 illustrates a state in which the image display unit 21 of FIG. 1 rotates about the rotating shaft 33 approximately 180 degrees. In other words, FIG. 4 illustrates a face-to-face shooting mode of the image recording/reproducing apparatus 10.

Figure 5:
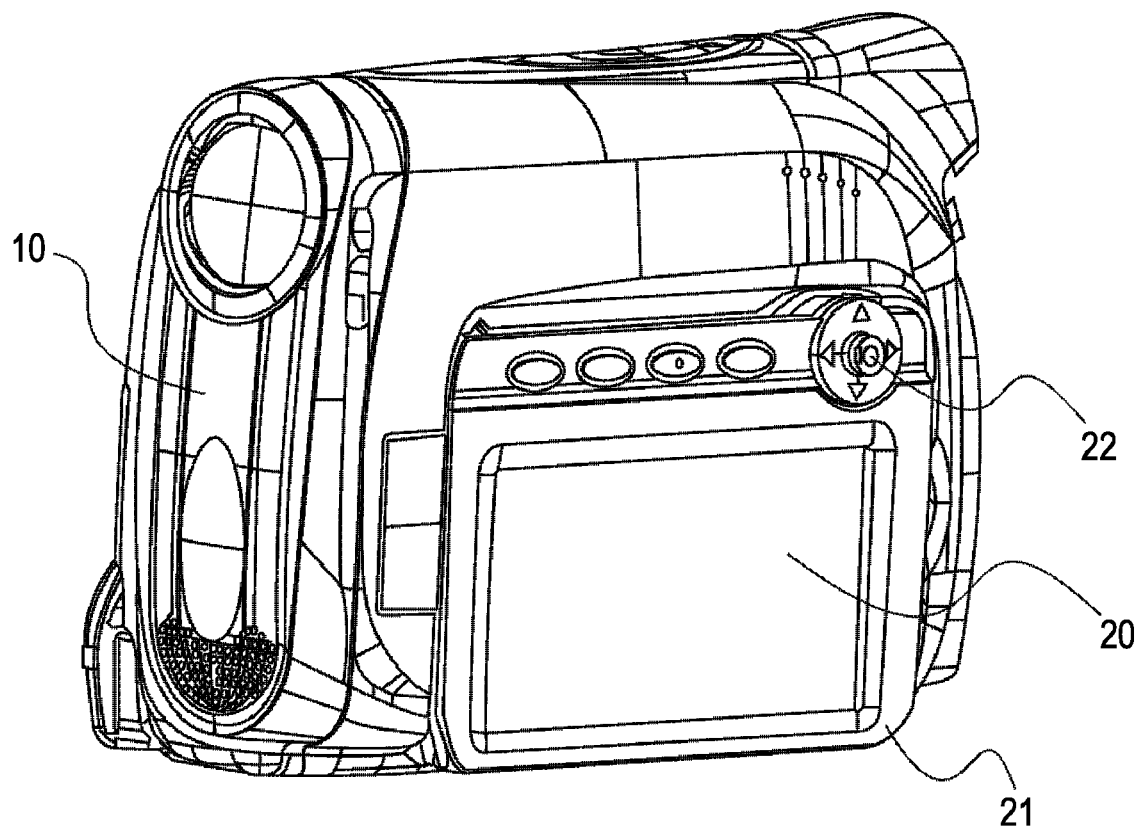
FIG. 5 is a perspective view illustrating an exemplary state in which the image display unit of FIG. 4 is housed in the image recording/reproducing apparatus according to an aspect of the present invention.

FIG. 5 illustrates a state in which the image display unit 21 of FIG. 4 pivots about the opening/closing shafts 32a and 32b (not visible) approximately 90 degrees in the closing direction and is housed in the recessed part 12 of the image recording/reproducing apparatus 10. In other words, FIG. 5 illustrates the image recording/reproducing apparatus 10 in which the image display unit 21 is housed in a reversed state.

Figure 6:
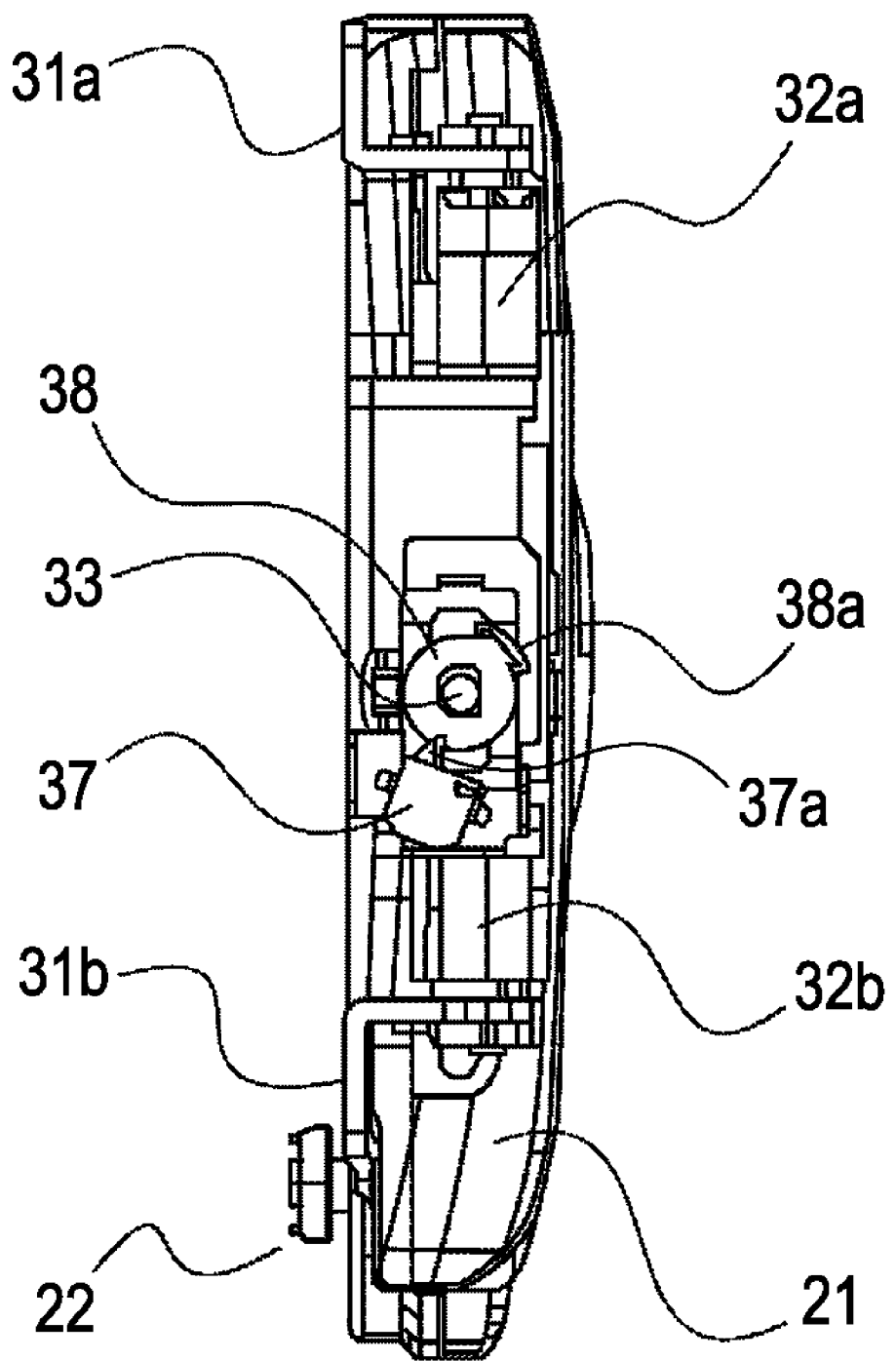
FIG. 6 illustrates the image display unit of FIG. 3 as viewed from the front (i.e., from the subject side during shooting) according to an aspect of the present invention.
Figure 7:
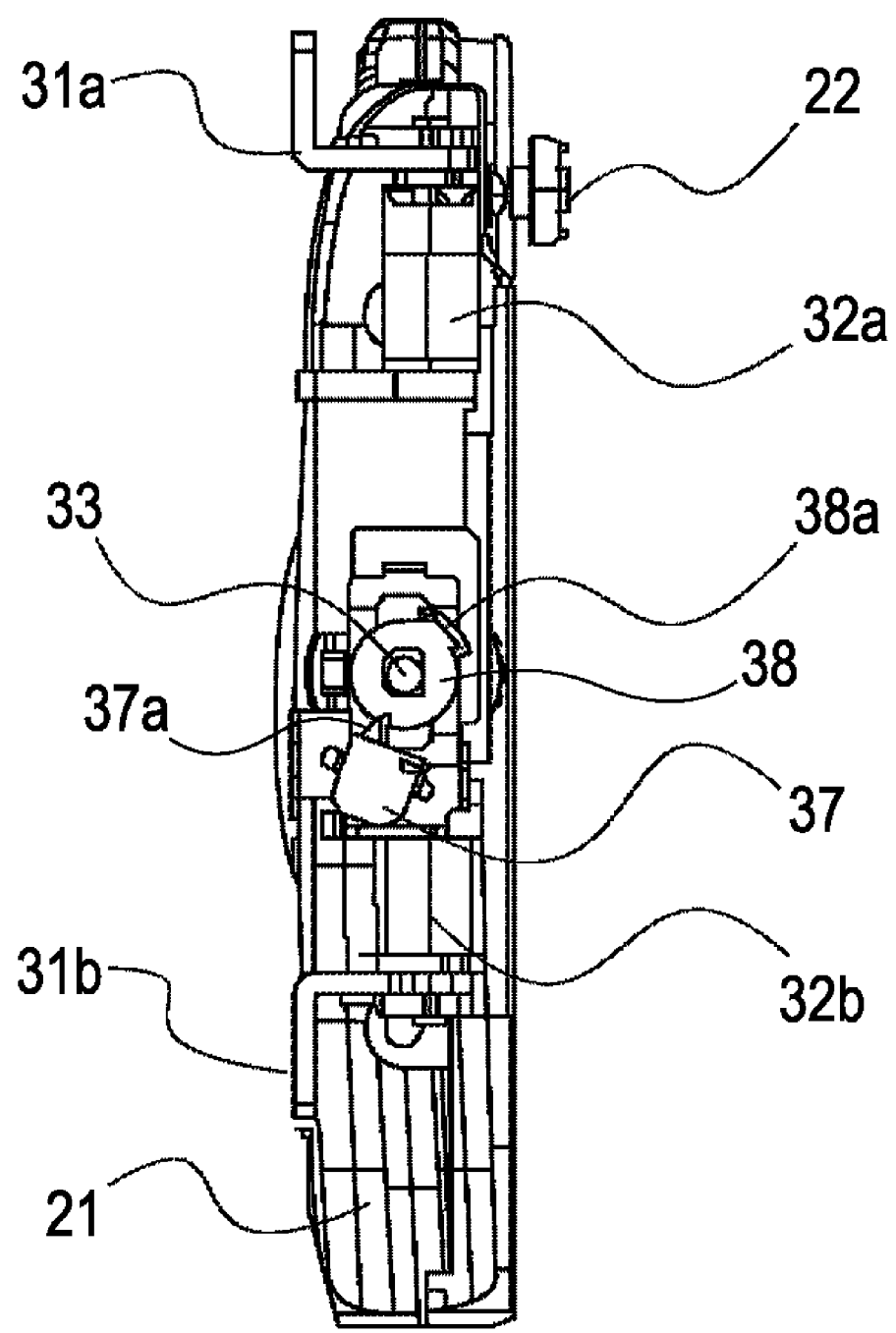
FIG. 7 illustrates the image display unit of FIG. 5 as viewed from the front (i.e., from the subject side during shooting) according to an aspect of the present invention.

FIG. 6 and FIG. 7 illustrate the image display unit 21 of FIG. 3 and FIG. 5, respectively, as viewed from the front (i.e., from the subject side during shooting). FIG. 6 illustrates a state in which the switch-side lever 37*a* of the rotation detecting switch 37 is not pressed by the lever 38*a* of the switch plate 38, and it is detected that the image display area 20 is positioned at about 0 degree relative to one side of the main body. FIG. 7 illustrates a state in which the switch-side lever 37*a* of the rotation detecting switch 37 is pressed by the lever 38*a* of the switch plate 38, and it is detected that the image display area 20 rotates about 180 degrees relative to the main body and faces outward.

Figure 8A:
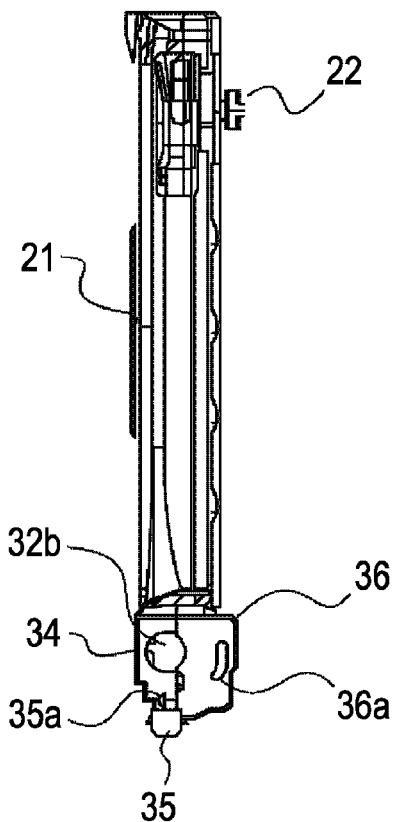
FIG. 8A illustrates the image display unit of FIG. 1 as viewed from the bottom.
Figure 8B:
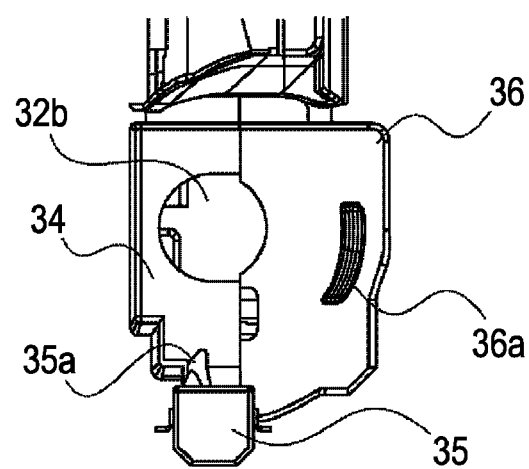
FIG. 8B is an enlarged view of an open/close detecting switch and its neighboring parts according to an aspect of the present invention.
Figure 9:
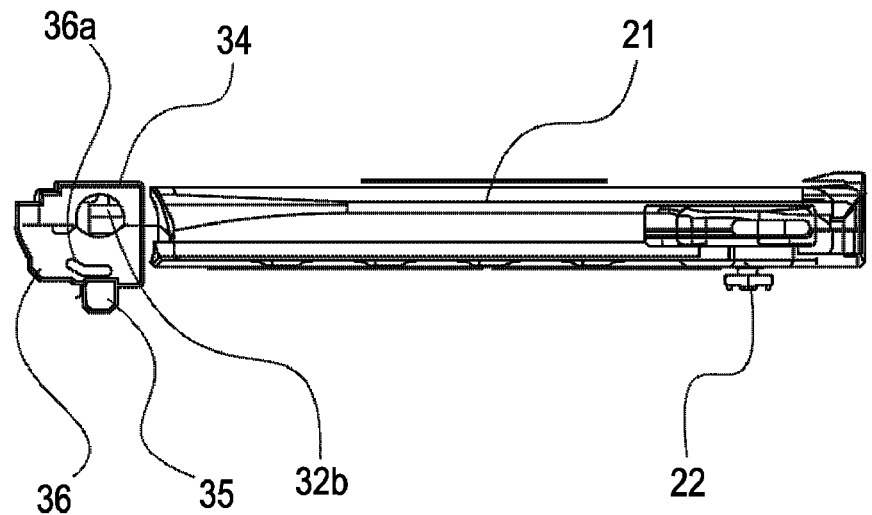
FIG. 9 illustrates the image display unit of FIG. 3 as viewed from the bottom according to an aspect of the present invention.

FIG. 8A and FIG. 9 illustrate the image display unit 21 of FIG. 1 and FIG. 3, respectively, as viewed from the bottom of the image recording/reproducing apparatus 10. A cover 34 covers the outside of the hinge unit 30. An open/close detecting switch 35 is attached to the main body of the image recording/reproducing apparatus 10 and detects an open/close state of the image display unit 21. A switch-side lever 35*a* is part of the open/close detecting switch 35. A cover 36 covers the main body side of the hinge unit 30. A rib 36*a* is part of the cover 36. The rib 36*a* is provided for allowing the image display unit 21 to open and close about the opening/closing shaft 32*b* and for turning the switch-side lever 35*a* ON and OFF. FIG. 8B is an enlarged view of the open/close detecting switch 35 and its neighboring parts.

FIGS. 8A and 8B further illustrate a state in which the switch-side lever 35*a* of the open/close detecting switch 35 is not pressed by the rib 36*a* of the cover 36, and it is detected that the image display unit 21 is located at the open position. Also, as illustrated in FIG. 6, the switch-side lever 37*a* of the rotation detecting switch 37 is not pressed by the lever 38*a* of the switch plate 38, and it is detected that the image display area 20 faces toward the main body.

FIG. 9 illustrates a state in which the switch-side lever 35*a* of the open/close detecting switch 35 is pressed by the rib 36*a* of the cover 36, and it is detected that the image display unit 21 is located at the closed position. Also, as illustrated in FIG. 6, the switch-side lever 37*a* of the rotation detecting switch 37 is not pressed by the lever 38*a* of the switch plate 38, and it is detected that the image display area 20 is positioned at about 0 degree relative to one side of the main body.

Figure 10:
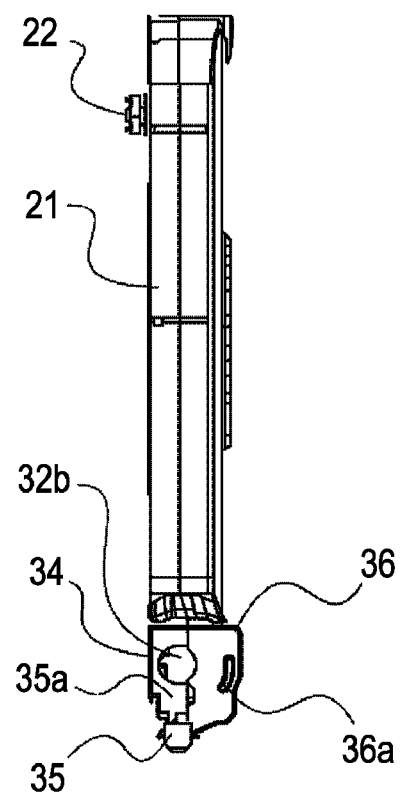
FIG. 10 illustrates the image display unit of FIG. 4 as viewed from the bottom according to an aspect of the present invention.
Figure 11:
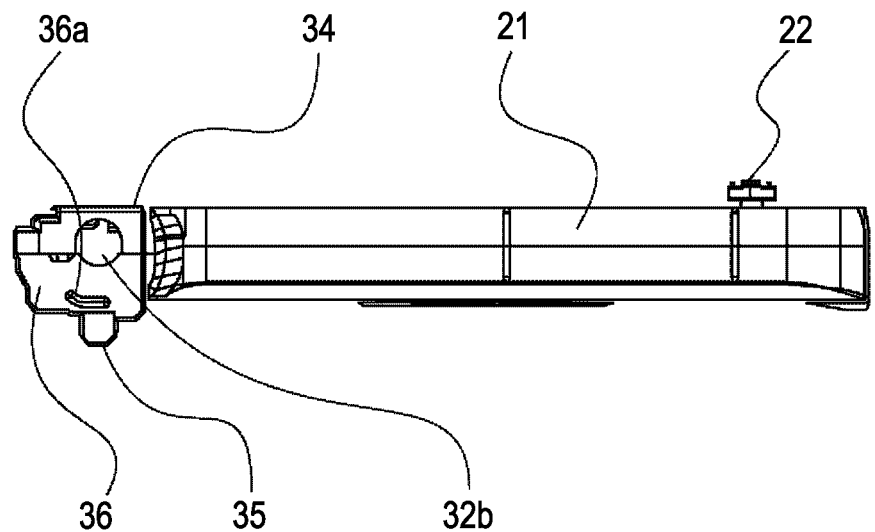
FIG. 11 illustrates the image display unit of FIG. 5 as viewed from the bottom according to an aspect of the present invention.

FIG. 10 and FIG. 11 illustrate the image display unit 21 of FIG. 4 and FIG. 5, respectively, as viewed from the bottom. FIG. 10 illustrates a state in which the switch-side lever 35*a* of the open/close detecting switch 35 is not pressed by the rib 36*a* of the cover B 36, and it is detected that the image display unit 21 is located at the open position. Also, as illustrated in FIG. 7, the switch-side lever 37*a* of the rotation detecting switch 37 is pressed by the lever 38*a* of the switch plate 38, and it is detected that the image display area 20 faces toward the outside of the main body.

FIG. 11 illustrates a state in which the switch-side lever 35*a* of the open/close detecting switch 35 is pressed by the rib 36*a* of the cover 36, and it is detected that the image display unit 21 is located at the closed position. Also, as illustrated in FIG. 7, the switch-side lever 37*a* of the rotation detecting switch 37 is pressed by the lever 38*a* of the switch plate 38, and it is detected that the image display area 20 is positioned at about 180 degrees relative to one side of the main body.

Figure 12:
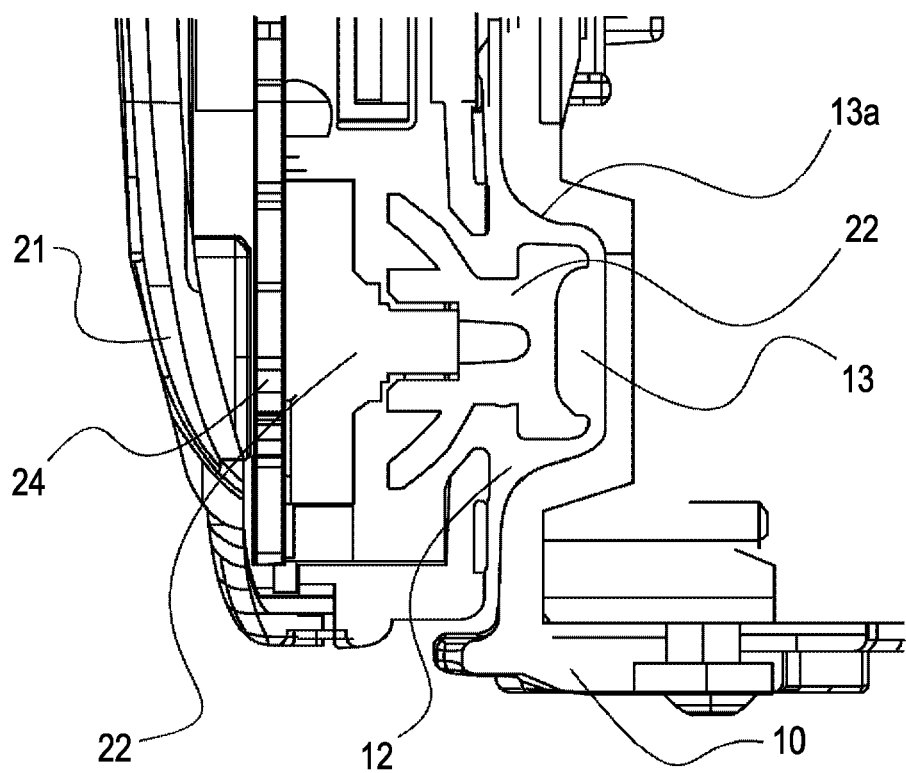
FIG. 12 is a cross-sectional view of an exemplary multidirectional operation switch and its neighboring parts when the image display unit is in the state of FIG. 3 according to an aspect of the present invention.

FIG. 12 is a cross-sectional view of the multidirectional operation switch 22 and its neighboring parts when the image recording/reproducing apparatus 10 is in the state of FIG. 3. The multidirectional operation switch 22 is mounted on a circuit board 24, which is connected to a control circuit (not illustrated) in the image recording/reproducing apparatus 10. The concave portion 13 is provided for preventing the multidirectional operation switch 22 from coming into contact with the image recording/reproducing apparatus 10 when the image display unit 21 is housed in the recessed part 12. In the image recording/reproducing apparatus 10 of FIG. 12, a corner 13*a* facing the image display unit 21 and the multidirectional operation switch 22 is rounded as illustrated. This prevents the multidirectional operation switch 22 from being caught and pressed by the corner 13*a* if, for example, the image display unit 21 is housed in the recessed part 12 while twisting force is applied thereto.

The hinge unit 30 for opening, closing, and rotating the image display unit 21 can bring the image recording/reproducing apparatus 10 into the state of FIG. 1, 3, 4, or 5. Then, the open/close detecting switch 35 or the rotation detecting switch 37 detects the state of the image display unit 21 and transmits the resulting information to the control circuit (not illustrated) in the image recording/reproducing apparatus 10.

Figure 13:
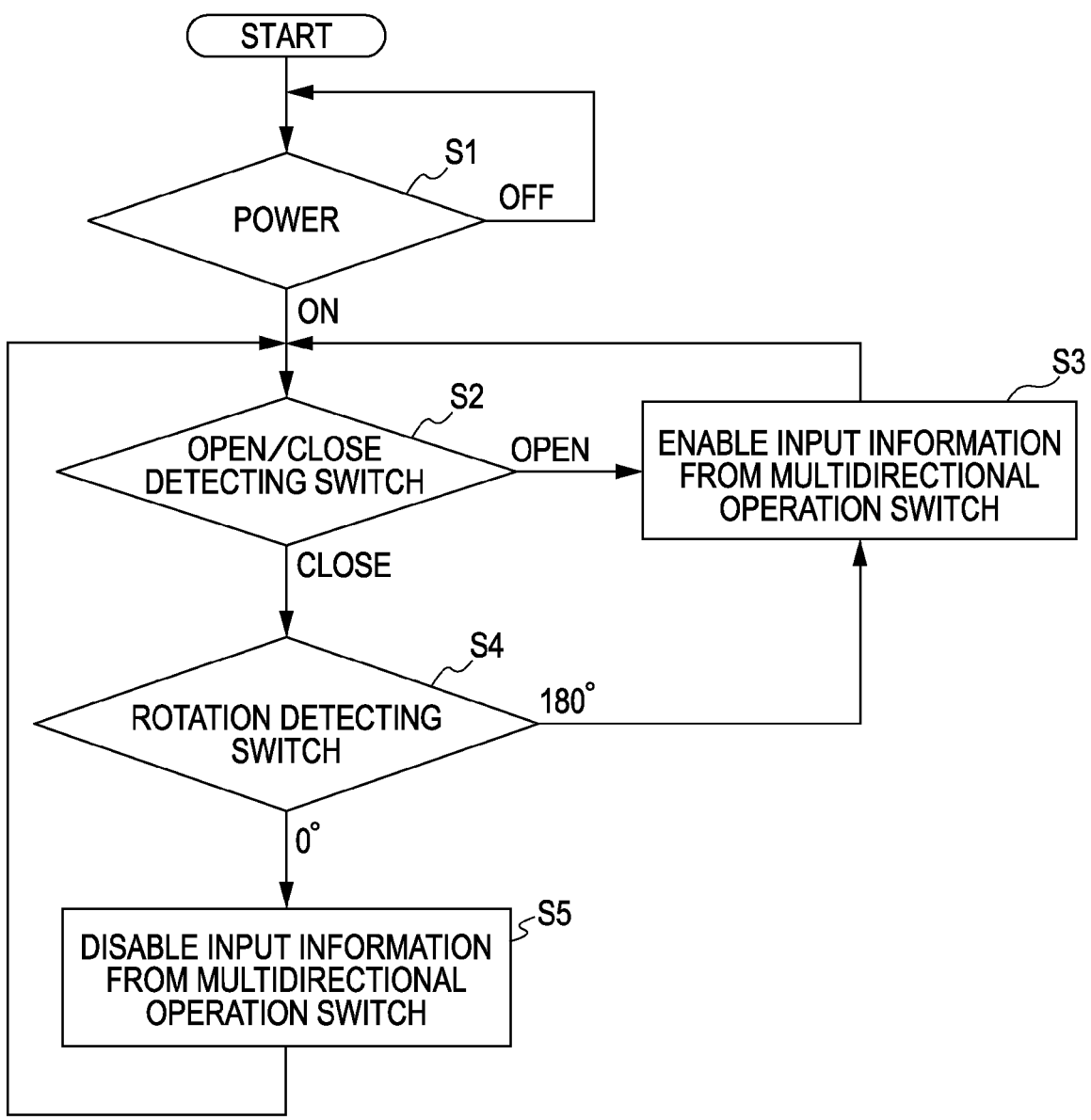
FIG. 13 is a flowchart illustrating exemplary operation of the image recording/reproducing apparatus according to an aspect of the present invention.
Figure 14:
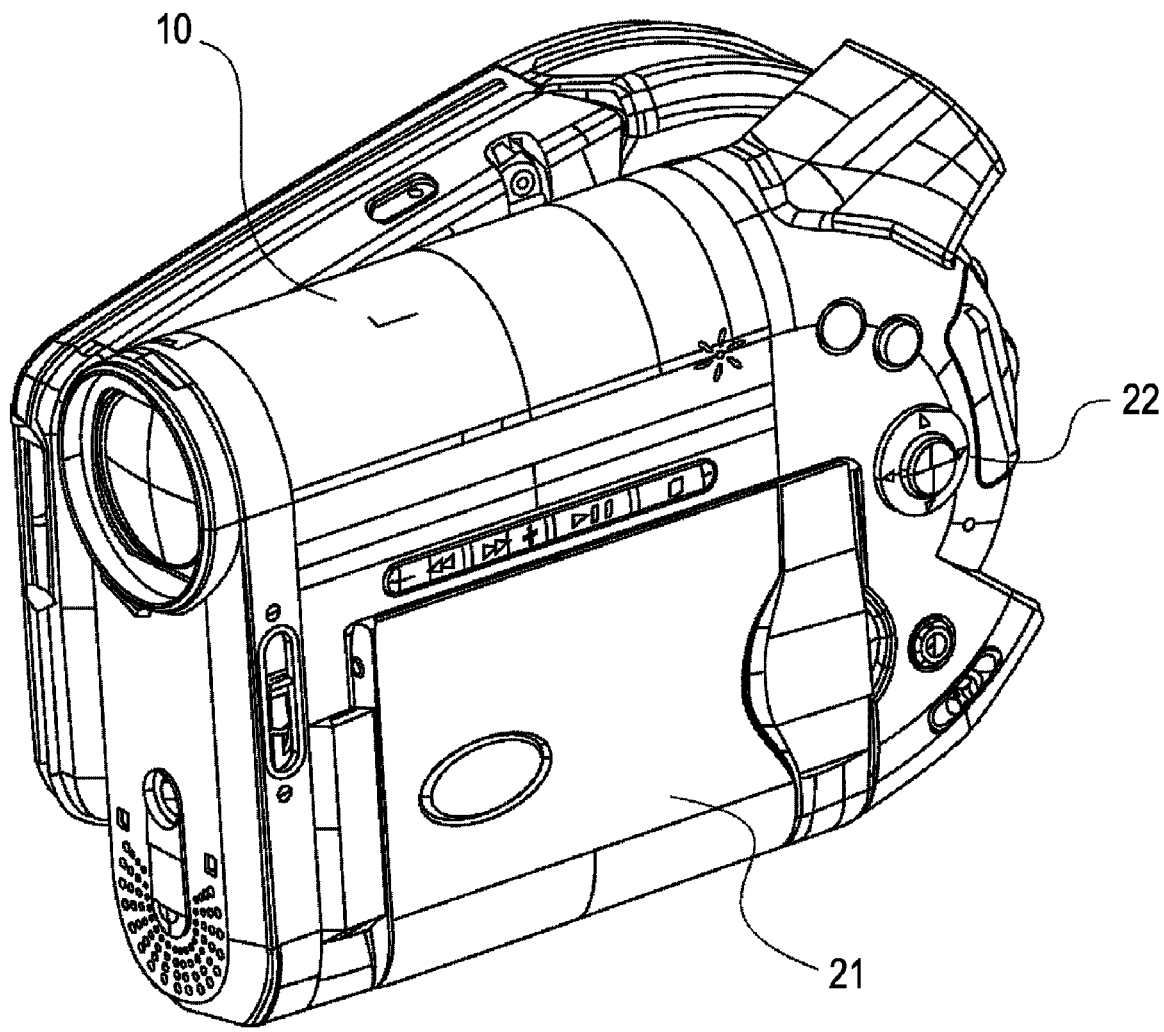
FIG. 14 illustrates a known image recording/reproducing apparatus.

FIG. 13 is a flowchart illustrating an exemplary operation of the image recording/reproducing apparatus 10. In step S1, it is determined whether the power of the image recording/reproducing apparatus 10 is ON or OFF, on the basis of the selected position of the power/mode switch 11. If it is determined in step S1 that the power is ON, the process proceeds to step S2 where it is determined which of "open" and "close" is detected by the open/close detecting switch 35. If the open/close detecting switch 35 detects that the image display unit 21 is in the open state, the process proceeds to step S3 where input information from the multidirectional operation switch 22 is enabled. Otherwise, if the open/close detecting switch 35 detects that the image display unit 21 is in the closed state, the process proceeds to step S4. In step S4, it is determined which of predetermined angles (here, e.g., 0 degree and 180 degrees) is detected by the rotation detecting switch 37. If the rotation detecting switch 37 detects in step S4 that the image display unit 21 is positioned at 0 degree with respect to the main body, the process proceeds to step S5 where input information from the multidirectional operation switch 22 is disabled. Otherwise, if the rotation detecting switch 37 detects in step S4 that the image display unit 21 is positioned at 180 degree with respect to the main body, the process returns to step S3.

Exemplary operation of the image recording/reproducing apparatus 10 of FIG. 1 (FIG. 6 and FIGS. 8A and 8B) will be described with reference to the flowchart of FIG. 13. In step S1, it is determined that the power is ON. In step S2, the open/close detecting switch 35 detects that the image display unit 21 is in the open state as illustrated in FIGS. 8A and 8B. In step S3, input information from the multidirectional operation switch 22 is enabled. A signal from the multidirectional operation switch 22 is received by the control circuit (not illustrated) in the image recording/reproducing apparatus 10. Then, the control circuit controls the image recording/reproducing apparatus 10 such that functions corresponding to each mode of the image recording/reproducing apparatus 10 are performed.

Next, exemplary operation of the image recording/reproducing apparatus 10 of FIG. 4 (FIG. 10) will be described with reference to the flowchart of FIG. 13. In step S1, it is determined that the power is ON. In step S2, the open/close detecting switch 35 detects that the image display unit 21 is in the open state as illustrated in FIG. 10. In step S3, input information from the multidirectional operation switch 22 is enabled. A signal from the multidirectional operation switch 22 is received by the control circuit (not illustrated) in the image recording/reproducing apparatus 10. Then, the control circuit controls the image recording/reproducing apparatus 10 such that functions corresponding to each mode of the image recording/reproducing apparatus 10 are performed.

Further, exemplary operation of the image recording/reproducing apparatus 10 of FIG. 5 (FIG. 7 and FIG. 11) will be described with reference to the flowchart of FIG. 13. In step S1, it is determined that the power is ON. In step S2, the open/close detecting switch 35 detects that the image display unit 21 is in the closed state as illustrated in FIG. 11. The process proceeds to step S4 where the rotation detecting switch 37 detects that the image display unit 21 is positioned at about 180 degrees with respect to the main body, as illustrated in FIG. 7. Then in step S3, input information from the multidirectional operation switch 22 is enabled. When the multidirectional operation switch 22 is operated, a signal from the multidirectional operation switch 22 is received by the control circuit (not illustrated) in the image recording/reproducing apparatus 10. Then, the control circuit controls the image recording/reproducing apparatus 10 such that functions corresponding to each mode of the image recording/reproducing apparatus 10 are performed.

Also, exemplary operation of the image recording/reproducing apparatus 10 of FIG. 3 (FIG. 6 and FIG. 9) will be described with reference to the flowchart of FIG. 13. In step S1, it is determined that the power is ON. In step S2, the open/close detecting switch 35 detects that the image display unit 21 is in the closed state as illustrated in FIG. 9. The process proceeds to step S4 where the rotation detecting switch 37 detects that the image display unit 21 is positioned at about 0 degree with respect to the main body, as illustrated in FIG. 6. Then in step S5, input information from the multidirectional operation switch 22 is disabled. Even if the multidirectional operation switch 22 is operated, the control circuit (not illustrated) in the image recording/reproducing apparatus 10 does not receive a signal from the multidirectional operation switch 22 and thus not perform control.

As described above, in the image recording/reproducing apparatus 10 of the present invention, the multidirectional operation switch 22 is disposed on the same surface on which the image display area 20 of the image display unit 21 is located, and is positioned near the image display area 20 and at an end opposite the end at which the hinge unit 30 is located. If, for example, the image recording/reproducing apparatus 10 is held with the right hand when shooting is performed in the state of FIG. 1, the image display unit 21 is touched by the left hand. Since the left hand can be placed on the other end of the hinge unit 30, the user can easily operate the multidirectional operation switch 22.

Similarly, when the user performs shooting in the state of FIG. 4 while looking through the viewfinder 14, the image display unit 21 is touched by the left hand. Again, since the left hand can be placed on the other end of the hinge unit 30, the user can easily operate the multidirectional operation switch 22. When the image pickup lens 15 is directed toward the user and the image recording/reproducing apparatus 10 is held with the left hand, the image display unit 21 is touched by the right hand. Since the right hand can be placed on the other end of the hinge unit 30, the user can easily operate the multidirectional operation switch 22.

When the front part of the image recording/reproducing apparatus 10 in the state of FIG. 5 is held with the left hand to check a reproduced image, the right hand can be placed on the image display unit 21 and located at the other end of the hinge unit 30. Therefore, the user can easily operate the multidirectional operation switch 22 with the right hand.

In other words, regardless of the position of the image display unit 21 of the image recording/reproducing apparatus 10, the multidirectional operation switch 22 is located at a position that allows easy operation.

When the multidirectional operation switch 22 is in an unused state as illustrated in FIG. 3, input information from the multidirectional operation switch 22 is disabled. Even if the multidirectional operation switch 22 accidentally comes into contact with the concave portion 13 and is turned ON, operation that is not intended by the user is not performed, as the control circuit (not illustrated) does not receive a signal from the multidirectional operation switch 22.

Moreover, since the corner 13a is provided, there is no need to increase the size of the concave portion 13 in consideration of, for example, rattling that may occur in the installation of the image display unit 21, variations in part dimensions, and accuracy in the mounting position of the multidirectional operation switch 22. Therefore, the concave portion 13 does not interfere with the reduction in size, thickness, and weight of the image recording/reproducing apparatus 10.

Moreover, instead of being disposed on the main body, the protruding multidirectional operation switch 22 is disposed on the same surface on which the image display area 20 of the image display unit 21 is located. Therefore, the multidirectional operation switch 22 does not affect the design features of the image recording/reproducing apparatus 10.

While a video camera has been described as an exemplary embodiment, the image recording/reproducing apparatus of the present invention may be a digital still camera, a mobile phone, or a personal digital assistant (PDA) as long as a hinge is used therein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-363447 filed Dec. 16, 2005 and No. 2006-275043 filed Oct. 6, 2006, which are hereby incorporated by reference herein in their entirety.

What is claimed:
1. An image recording/reproducing apparatus comprising:
a recording/reproducing unit configured to record or reproduce an image;
an image display unit having an image display surface configured to display the image;
a biaxial hinge configured to attach the image display unit to the image recording/reproducing apparatus so as to allow the image display unit to open and close with respect to the recording/reproducing unit and to rotate with respect to the recording/reproducing unit in a case where the image display unit is in an open state with respect to the recording/reproducing unit;
a multidirectional operation switch which is disposed on the same surface side as the image display surface of the image display unit and is positioned at the other end of the biaxial hinge;
an open/close detecting unit configured to detect an open/close state of the image display unit with respect to the recording/reproducing unit;
a rotation detecting unit configured to detect a rotating state of the image display unit with respect to the recording/reproducing unit; and
a control unit configured to perform control for enabling or disabling an input from the multidirectional operation switch on the basis of the open/close state detected by the open/close detecting unit and the rotating state detected by the rotation detecting unit.

2. The image recording/reproducing apparatus according to claim 1, wherein a surrounding portion of the multidirectional operation switch protrudes from an outer edge of the image display unit; and wherein the protruding portion of the multidirectional operation switch serves as a finger grip in a case where the image display unit is in a close state with respect to the recording/reproducing unit.

3. An image recording/reproducing apparatus comprising:

a recording/reproducing unit configured to record or reproduce an image;

an image display unit having an image display surface configured to display the image;

a biaxial hinge configured to attach the image display unit to the image recording/reproducing apparatus so as to allow the image display unit to open and close with respect to the recording/reproducing unit and to rotate with respect to the recording/reproducing unit in a case where the image display unit is in an open state with respect to the recording/reproducing unit; and a multidirectional operation switch which is disposed on the same surface side as the image display surface of the image display unit and is positioned at the other end of the biaxial hinge, wherein the image recording/reproducing apparatus further comprises a concave portion formed in the recording/reproducing unit at a portion corresponding to the multidirectional operation switch so as to prevent the multidirectional operation switch from coming into contact with the image recording/reproducing unit in a case where the image display unit is in the close state with respect to the recording/reproducing unit and the image display surface of the image display unit faces to the recording/reproducing unit.

4. The image recording/reproducing apparatus according to claim 3, wherein a surrounding portion of the multidirectional operation switch protrudes from an outer edge of the image display unit; and wherein the protruding portion of the multidirectional operation switch serves as a finger grip in a case where the image display unit is in a close state with respect to the recording/reproducing unit.

* * * * *